(12) United States Patent
Vuille et al.

(10) Patent No.: US 10,991,530 B2
(45) Date of Patent: Apr. 27, 2021

(54) PORTABLE OBJECT COMPRISING A NEAR-FIELD CONNECTION DEVICE

(71) Applicant: The Swatch Group Research and Development Ltd, Marin (CH)

(72) Inventors: Pierry Vuille, Les Emibois (CH); Jean-Claude Martin, Montmollin (CH); Michel Willemin, Preles (CH); Thierry Scordilis, Cormondreche (CH)

(73) Assignee: The Swatch Group Research and Development Ltd, Marin (CH)

( * ) Notice: Subject to any disclaimer, the term of this patent is extended or adjusted under 35 U.S.C. 154(b) by 603 days.

(21) Appl. No.: 15/835,495

(22) Filed: Dec. 8, 2017

(65) Prior Publication Data
US 2018/0190455 A1   Jul. 5, 2018

(30) Foreign Application Priority Data
Dec. 29, 2016   (EP) .................................... 16207333

(51) Int. Cl.
*H01H 36/00*   (2006.01)
*G04G 21/04*   (2013.01)
(Continued)

(52) U.S. Cl.
CPC ......... *H01H 36/0013* (2013.01); *G04G 21/04* (2013.01); *G04R 60/08* (2013.01);
(Continued)

(58) Field of Classification Search
CPC .. H01H 36/0013; H01H 36/006; G04G 21/04; H01Q 7/00
(Continued)

(56) References Cited

U.S. PATENT DOCUMENTS

| 6,825,751 B1 | 11/2004 | Kit et al. |
| 2002/0101457 A1 | 8/2002 | Lang |

(Continued)

FOREIGN PATENT DOCUMENTS

| CN | 102906766 A | 1/2013 |
| EP | 1 876 556 A1 | 1/2008 |
| WO | WO 2011/067543 A1 | 6/2011 |

OTHER PUBLICATIONS

European Search Report dated Jun. 8, 2017 in European Application 16207333.2, filed on Dec. 29, 2016 ( with English Translation of Categories of Cited Documents ).

(Continued)

*Primary Examiner* — Alfonso Perez Borroto
(74) *Attorney, Agent, or Firm* — Oblon, McClelland, Maier & Neustadt, L.L.P.

(57) ABSTRACT

A portable object including a near-field communication device. The communication device includes an antenna, the ends of which are configured to be connected electrically to an electronic chip, forming, together with the chip, an electrical circuit. In an original manner, the portable object includes a control element which is able to be displaced between two predefined positions, i.e. an active position wherein the communication device is activated and a passive position wherein the communication device is deactivated. The portable object includes, furthermore, a mechanical switch which is able to switch between an open state and a closed state in response to a displacement of the control element from one to the other of its predefined positions.

17 Claims, 8 Drawing Sheets

(51) Int. Cl.
*G06K 19/073* (2006.01)
*G06K 19/077* (2006.01)
*G04R 60/08* (2013.01)
*G04R 20/26* (2013.01)
*H01H 36/02* (2006.01)
*H01Q 1/22* (2006.01)
*H01Q 1/27* (2006.01)
*H01Q 7/00* (2006.01)

(52) U.S. Cl.
CPC . *G06K 19/07345* (2013.01); *G06K 19/07762* (2013.01); *H01H 36/006* (2013.01); *G04R 20/26* (2013.01); *H01H 36/02* (2013.01); *H01H 2235/01* (2013.01); *H01Q 1/22* (2013.01); *H01Q 1/273* (2013.01); *H01Q 7/00* (2013.01)

(58) Field of Classification Search
USPC .......................................................... 307/115
See application file for complete search history.

(56) References Cited

U.S. PATENT DOCUMENTS

| | | | |
|---|---|---|---|
| 2006/0139320 | A1 | 6/2006 | Lang |
| 2007/0152828 | A1* | 7/2007 | Mohalik .......... G06K 19/07345 340/572.3 |
| 2008/0006696 | A1* | 1/2008 | Piersol ............ G06K 19/07381 235/451 |
| 2008/0100448 | A1* | 5/2008 | Sharma .............. G08B 13/2417 340/572.3 |
| 2009/0022014 | A1* | 1/2009 | Gracia ............... G04B 37/0445 368/311 |
| 2009/0201771 | A1* | 8/2009 | Miyahara ................ H01Q 7/06 368/47 |
| 2011/0049232 | A1* | 3/2011 | Khozyainov ........ G01R 29/085 235/375 |
| 2011/0248819 | A1* | 10/2011 | Saito .................... H01Q 1/3241 340/5.64 |
| 2012/0241524 | A1* | 9/2012 | Blot .................. G06K 7/10237 235/492 |
| 2013/0127599 | A1* | 5/2013 | Foster ..................... G07C 9/28 340/10.5 |
| 2013/0234835 | A1 | 9/2013 | Piersol et al. |
| 2014/0112112 | A1* | 4/2014 | Plankert ................. C04B 41/52 368/276 |
| 2014/0316305 | A1* | 10/2014 | Venkatraman ......... A61B 5/681 600/595 |
| 2016/0188925 | A1* | 6/2016 | Liu ..................... G06K 19/073 340/10.34 |
| 2017/0076193 | A1 | 3/2017 | Piersol et al. |
| 2017/0169675 | A1* | 6/2017 | Burgess ................ G08B 13/08 |
| 2017/0261944 | A1* | 9/2017 | Fujisawa ................ G04R 60/10 |

OTHER PUBLICATIONS

Combined Chinese Office Action dated Jul. 6, 2020, in Patent Application No. 201711456531.1 (with English translation), 10 pages.

* cited by examiner

PORTABLE OBJECT COMPRISING A NEAR-FIELD CONNECTION DEVICE

This application claims priority from European Patent Application No. 16207333.2 filed on Dec. 29, 2016, the entire disclosure of which is incorporated herein by reference.

TECHNICAL FIELD

The present invention relates to the field of microtechnology. It concerns, more particularly, a portable object comprising a near-field connection device.

PRIOR ART

It is known to produce portable objects incorporating near-field communication means, for example using a radiofrequency tag. These connection means are composed of an electronic chip, or integrated circuit, connected electrically to an antenna. Most of the time, these devices do not require an autonomous electrical supply and are intended to communicate automatically with a reader as soon as they approach one. The electromagnetic field of the reader generates an induced current in the antenna which supplies the chip and makes it possible for it to emit, in turn, a signal via the antenna.

At present, such devices are found in chip cards which make it possible to effect contactless payments at terminals provided for this purpose. Likewise, patent applications EP 603 721, EP 974 878, CH 690 525 or CH 704 583 are known, which describe watches comprising near-field communication means in which the antennae are concealed at various places in the watch, such as the dial, the middle, the bezel, the glass seal or the glass. Other configurations provide for housing the antenna in the base, the movement or even the strap. Integration of these contactless communication devices in a watch allows numerous applications such as producing information-, identification-, locking-, access control- or payment operations.

However, these automatic communication devices have high vulnerability with respect to ill-intentioned third parties who could, by approaching a transmitter-receiver, recover, without the knowledge of their owners, confidential information or could carry out bank transfers to their own advantage. Various approaches have been developed for securing near-field communication devices. Payment cards are thus able to be placed in screened cases which act like a Faraday cage and prevent establishment of any communication. Patent application US 2016/0188925 describes a method for activating or deactivating a radiofrequency tag which has an electronic switch using a suitable auxiliary reader. The electronic unlocking operation can prove to be tedious and not particularly practical since it requires dealing with an object other than the one via which the communication is established. In addition, it presents a security flaw because the near-field communication device remains vulnerable between the moment when it is activated and that when communication is established. The various security methods known are unsuited to some portable objects such as a wristwatch, are not particularly practical and do not make it possible totally to eliminate hacking risks.

SUMMARY OF THE INVENTION

The object of the present invention is to propose a means for securing a near-field communication device integrated in a portable object which is easy to use and safer than the solutions of the prior art.

More precisely, the invention relates to a portable object comprising a near-field communication device. The communication device comprises an antenna, the ends of which are intended to be connected electrically to an electronic chip, as standard integrating a filter, typically a bandpass filter, forming, together with the electronic chip, an electrical circuit. In an original manner, the portable object comprises a control element which is able to be displaced between two predefined positions, i.e. an active position in which the communication device is activated and a passive position in which the communication device is deactivated. The portable object comprises, furthermore, a mechanical switch which is able to switch between an open state and a closed state in response to a displacement of the control element from one to the other of its predefined positions.

This arrangement makes it possible to secure a near-field communication device integrated into a portable object whilst simplifying the operations required for this security.

According to a first variant of the invention, the mechanical switch is mounted in series on the electrical circuit and is situated in the open state when the control element is in passive position.

According to a second variant, the mechanical switch is mounted in parallel with the antenna and is situated in the closed state when the control element is in passive position.

According to another advantageous variant of the invention, the mechanical switch is a Reed switch and the portable object comprises a permanent magnet which is mobile relative to the Reed switch and able to modify the state of the Reed switch in response to a displacement of the control element.

According to another advantageous variant of the invention, the permanent magnet is connected kinematically to the control element.

According to another advantageous variant of the invention, the Reed switch is connected kinematically to the control element.

According to another advantageous variant of the invention, the portable object comprises at least two Reed switches disposed in an essentially perpendicular manner.

According to another advantageous variant of the invention, the portable object comprises a security switch which is provided to change state simultaneously with the Reed switch in the presence of an external magnetic field.

According to an advantageous variant of the invention, the portable object comprises a restoring means provided to return the control element automatically from the active position to the passive position.

According to another advantageous variant of the invention, the restoring means comprises an elastic element.

According to another advantageous variant of the invention, the portable object comprises a time delay means provided to delay return of the control element from the active position to the passive position.

According to another advantageous variant of the invention, the portable object is a watch.

According to another advantageous variant of the invention, the watch comprises a pivoting bezel which is the control element.

According to another advantageous variant of the invention, the antenna is formed by a "Ceragold™" process.

According to another advantageous variant of the invention, the watch comprises a push button which is the control element.

According to another advantageous variant of the invention, the portable object is a chip card.

According to another advantageous variant of the invention, the chip card comprises a flexible segment delimiting a part which is the control element.

According to another advantageous variant of the invention, the chip card comprises a deformable wall delimiting at least partially a recess, the deformable wall being the control element.

BRIEF DESCRIPTION OF THE FIGURES

Other details of the invention will appear more clearly upon reading the description which follows, with reference to the annexed drawings in which.

DETAILED DESCRIPTION

Figure 1:
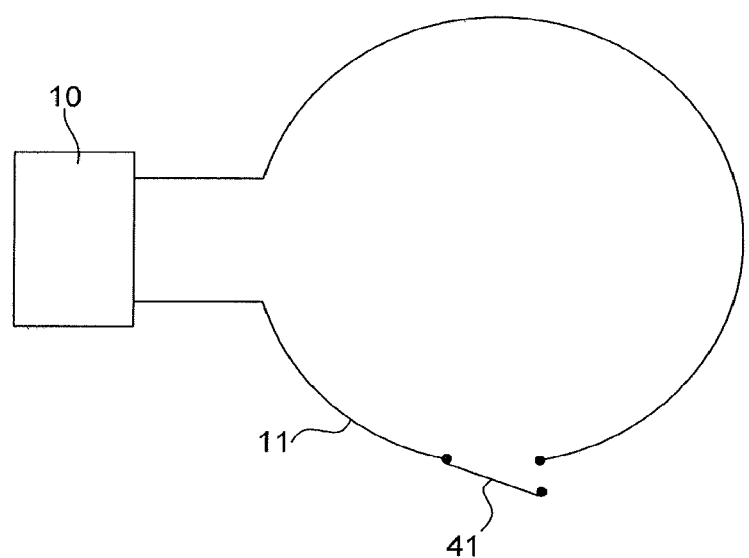
FIG. 1 represents a basic diagram of a first variant of the invention.
Figure 2:
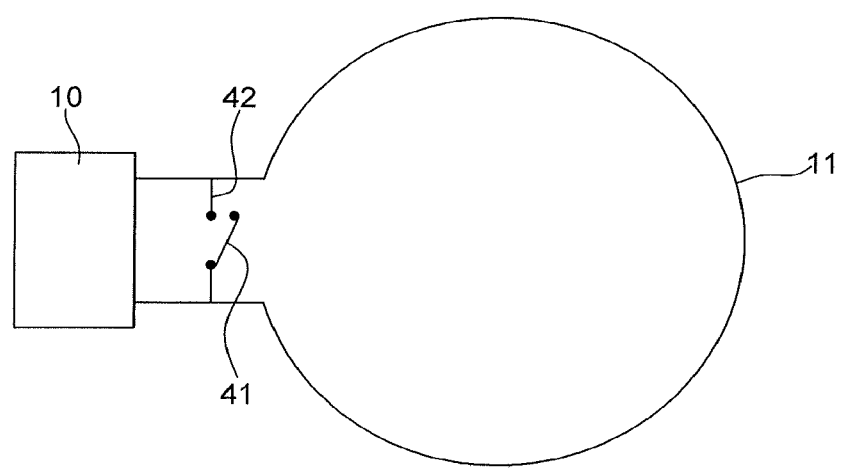
FIG. 2 represents a second variant of the invention.
Figure 3:
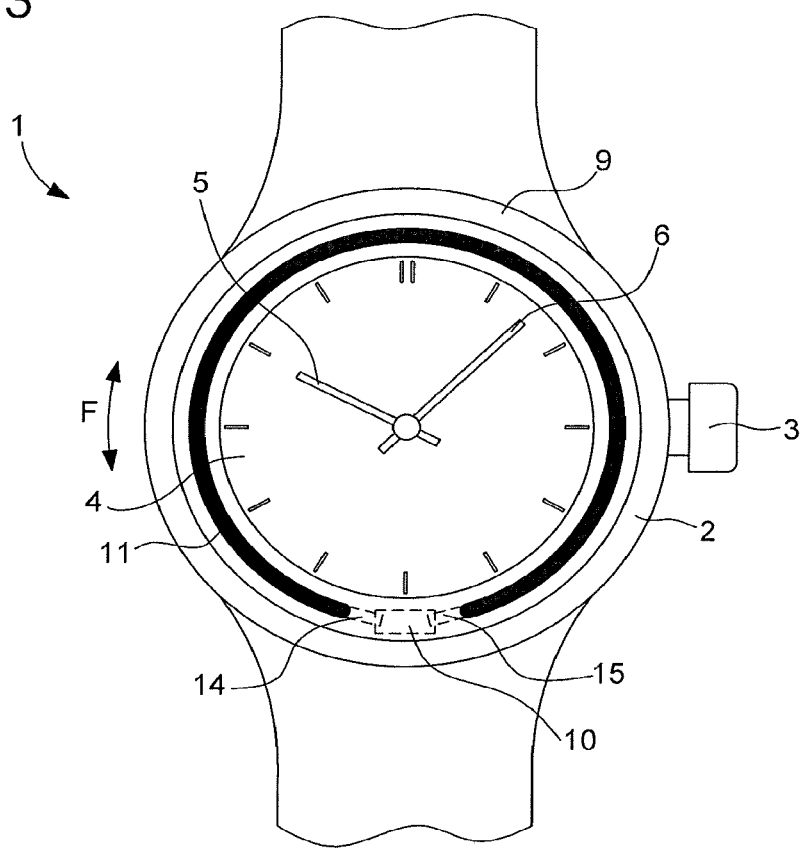
FIG. 3 represents a view of a watch according to a first embodiment of the invention.
Figure 4:
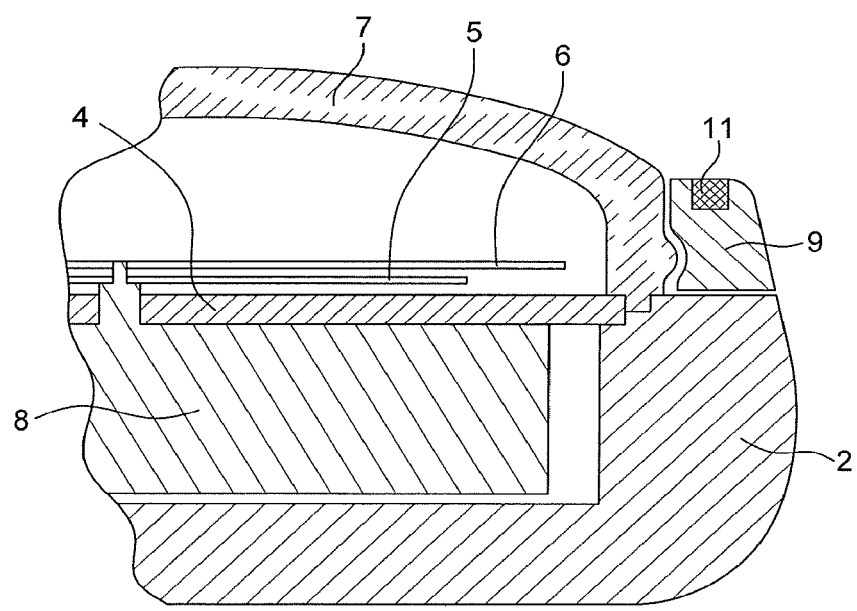
FIG. 4 represents a sectional view of the watch represented in FIG. 3, FIGS. 5 and 6 represent a sectional view of the watch of FIG. 3, respectively in the passive and active positions if the switch is in series with the electrical circuit.

FIGS. 1 and 2 represent basic diagrams of the secured near-field communication device which the invention proposes to integrate in portable objects. The communication device comprises an electronic chip 10, two terminals of which are connected to the ends of an antenna 11 in the form of a loop and forming, with the electronic chip 10, integrating a bandpass filter, for example of the RLC type, an electrical circuit.

In a first variant represented in FIG. 1, a mechanical switch 41 is mounted in series on the electrical circuit. The switch 41 is situated represented in the open state, i.e. the communication device is deactivated and, as a result, secured. Closing of the switch 41 renders the device active and able to effect near-field communications.

In a second variant represented in FIG. 2, a bypass branch 42 is connected to the terminals of the electronic chip and constitutes a branch parallel to that formed by the antenna 11. The bypass branch comprises a switch 41 which is situated therefore mounted in parallel with the antenna 11. When the switch is in the closed state, the antenna is short-circuited and the communication device is deactivated. Inversely, the device is activated and able to communicate when the switch is placed in the open state as is represented in FIG. 2.

FIGS. 1 to 4 represent a first portable object according to the first variant of the invention, i.e. a watch 1 with an analogue display which comprises a middle 2, a control crown 3, a dial 4, hands 5, 6, a glass 7 and a movement 8. The watch likewise comprises a bezel 9 which is mounted pivotably relative to the case 2 in two directions (arrow F in FIG. 3) over at least one predetermined angular distance as will be seen in the following description. The watch comprises furthermore a near-field communication device composed of an electronic chip 10 housed in the middle 2, and an antenna 11 in the form of a loop, the two ends of which are intended to be connected electrically to the electronic chip 10 forming with it an electrical circuit. The antenna is formed over the upper part of the bezel 9 in a conductive material, typically a metallic material. The bezel is preferably produced in a non-conductive material, such as a ceramic. Manufacture of such a component can be obtained by the "Ceragold™" process, described in the patent application EP 2 725 000. This process makes it possible to produce end portions 12, 13 in a conductive material which traverses the bezel 9 and connects the antenna situated on the upper part to the lower part of the bezel on which they open out. Elastic contact feet 14, 15, connected to the electronic chip 10, are provided in order to abut against the lower part of the bezel 9.

Figure 5:
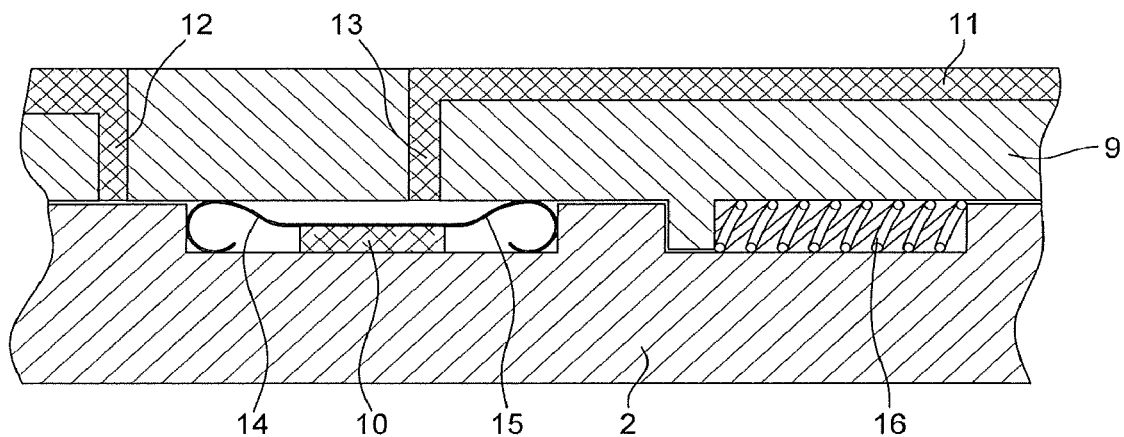

When the control element, here the bezel, is in a first predefined position, termed passive position, represented in FIG. 5, the contact feet 14, 15 abut against the non-conductive material of the bezel 9 so that the electrical circuit formed by the antenna 11 and the chip 10 is open and so that the near-field communication device is deactivated.

Figure 6:
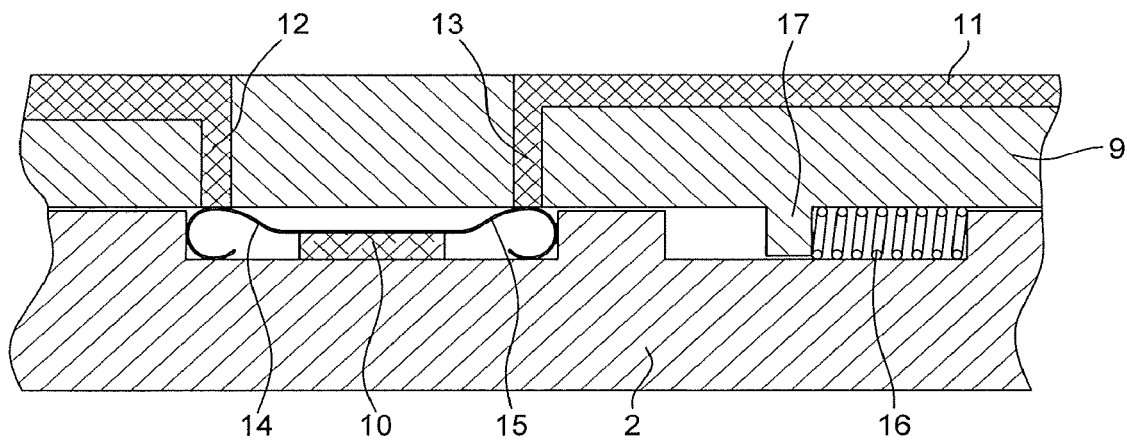

When the control element is in a second predefined position, termed active position, represented in FIG. 6, the contact feet 14, 15 abut against the conductive material of the end portions 12, 13 so that the electronic chip 10 is connected electrically to the antenna 11 and so that the electrical circuit is active and can perform its function in the presence of a near-field.

Hence by pivoting the bezel 9, it is possible to activate and deactivate, at will, the near-field communication device which makes it possible, by deactivating the device, to guard against the risks of fraudulent communication. The assembly composed by the bezel and the end portions 12, 13, on the one hand, and by the contact feet 14, 15 and the case, on the other hand, forms a mechanical switch 41, as appears in the basic diagram of FIG. 1. The example described here takes into account that the switch is in series with the electrical circuit. Of course, it can be adapted for the case where this switch is in parallel with the electrical circuit, and where the closed, respectively open, positions correspond to an inactive, respectively active, circuit.

The watch 1 can likewise comprise a restoring means in the form of a spring 16, provided in order to return the bezel 9 from the active position to the passive position. The spring 16 is placed in a housing of the middle and comes to abut against a lug 17 which is integral with the bezel 9. A limit stop, not represented, makes it possible to index the position of the bezel in the active position where the contact feet 14, 15 abut against the end portions 12, 13 of the antenna 11.

The user who wishes to activate the device, for example in order to make a payment, must pivot the bezel 9 in opposition to the action of the restoring spring 16 up to the limit stop. As soon as he releases the bezel 9, the latter returns automatically into the passive position where the device is inactive. The restoring means thus offers additional security by reducing the risk of forgetting that the bezel is in the active position. Alternatively, it is also conceivable to introduce a time delay means at the level of the control element in order to slow down or delay its return into the passive position so that the communication device remains active for the time necessary to establish the connection without the user having to keep the control element in the active position. This presents, as another advantage, avoiding a communication fault in the case where the user might release the control element prematurely.

Figure 7:
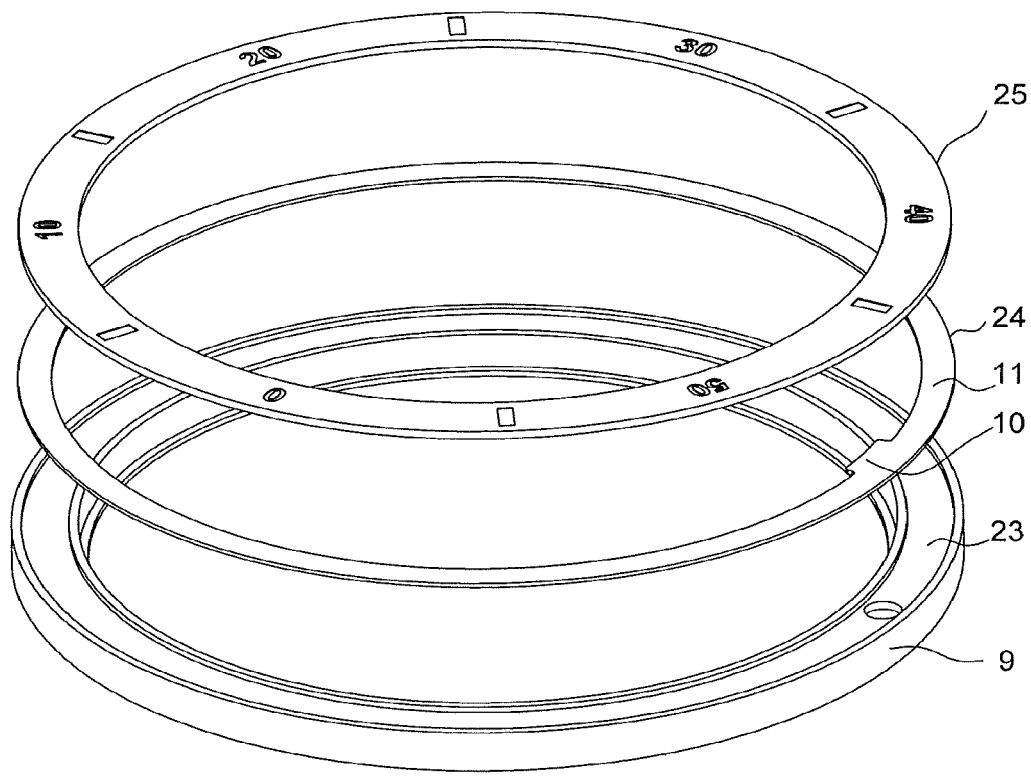
FIG. 7 represents a perspective view of an embodiment variant of the bezel of the watch of FIG. 3.

Other technical solutions for producing the antenna are possible. The galvanic growth can be replaced by soldering paste. Likewise, the bezel can be machined in ceramic material for insertion of the antenna in the form of a coiled wire of the loop type. In another variant represented in FIG. 7, there is produced, in a non-conductive material, a pivoting bezel 9 which comprises over its circumference a housing 23 in which a thin printed circuit 24, bearing the electronic chip 10 and the antenna 11 in the form of a loop, is inserted. A cover 25 makes it possible to close the housing 23 whilst protecting and fixing the printed circuit 24. The cover 25 will be able to be produced in any sort of non-conductive material, such as a polymer or a ceramic. The circuit formed by the antenna 11 is open and its ends open opposite a conductive blade situated on the case analogously to that represented in connection with FIGS. 5 and 6. The ends come into galvanic contact with the conductive blade when the bezel is in the active position so as to activate the near-field communication device.

Figure 8:
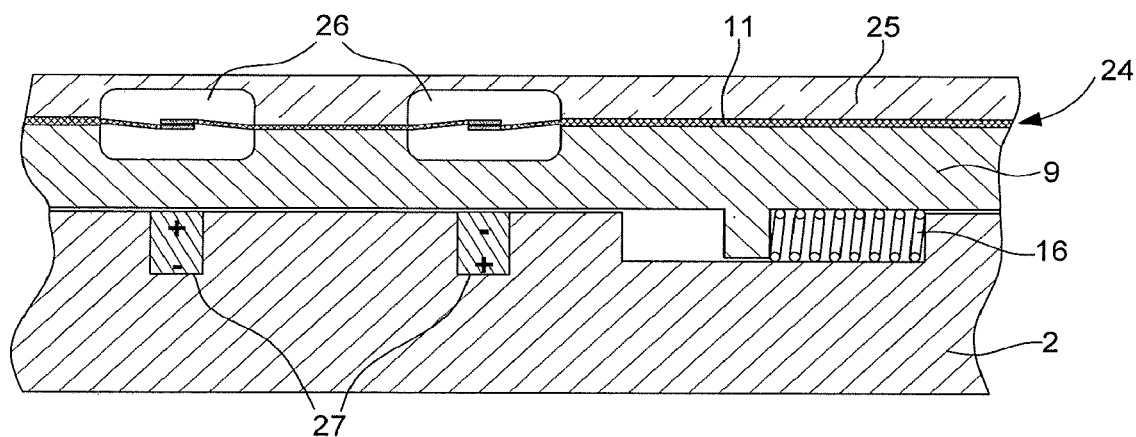
FIG. 8 represents a sectional view of an embodiment detail of a watch according to the invention.

FIG. 8 represents a section of another variant of the watch of FIG. 5 in which the electrical circuit, composed of the electronic chip 10 and the antenna 11, comprises another type of mechanical switch, in this case a magnetic switch 26 with a flexible blade of the Reed switch type, in place of the galvanic switch described previously. In this case, the watch likewise comprises a permanent magnet 27, connected kinematically to the case and movable relative to the Reed switch 26 which is, itself, connected kinematically to the control element. The assembly is provided so that displacement of the control element, here the bezel 9, between its predefined positions, changes the state of the Reed switch 26. FIG. 8 represents the control element in its active position. In the illustrated embodiment, the Reed switch 26 is integral with the bezel 9 whilst the permanent magnet 27 is integral with the case 2. Alternatively, the electrical circuit and the Reed switch 26 could be housed in the case and the magnet could be connected kinematically to the control element.

In a non-represented embodiment variant, a portable object comprises at least two Reed switches 26, cooperating with at least one permanent magnet 27. In an original manner, the Reed switches 26 are disposed so that an external magnetic field would not be able to switch the assembly of Reed switches simultaneously. To achieve this, the Reed switches have separate orientations and are preferably disposed in a substantially perpendicular manner. The switches 26 are thus prevented from being able to be closed simultaneously by being placed in a homogeneous external magnetic field during a fraudulent connection attempt using a reader and a magnet. This constitutes additional security for near-field communication devices using Reed switches.

Figure 9:
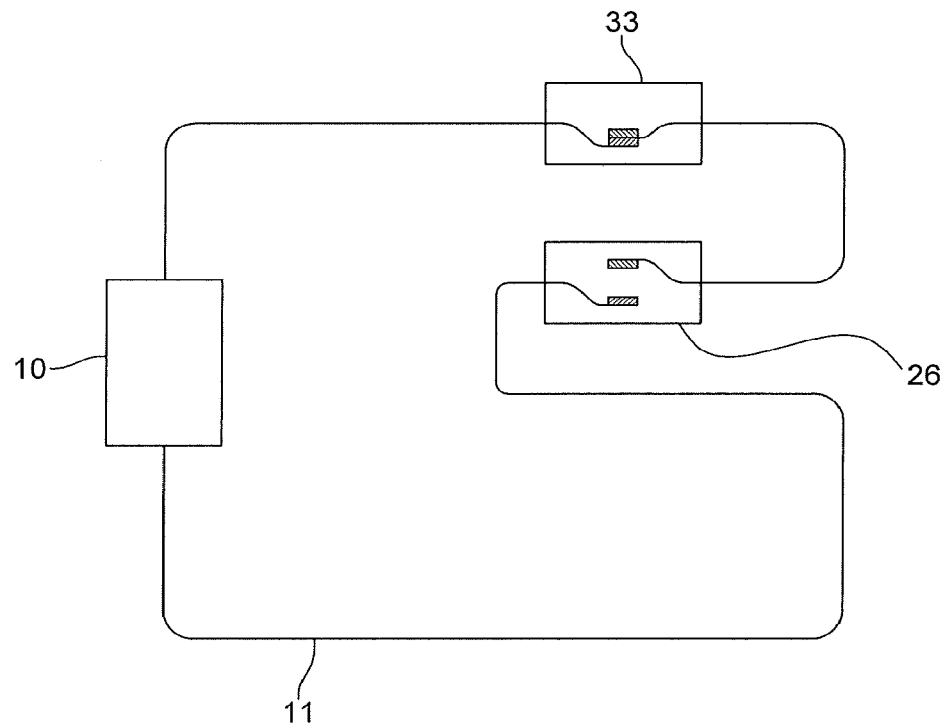
FIGS. 9 and 10 represent basic diagrams of a secured device with a Reed switch.
Figure 10:
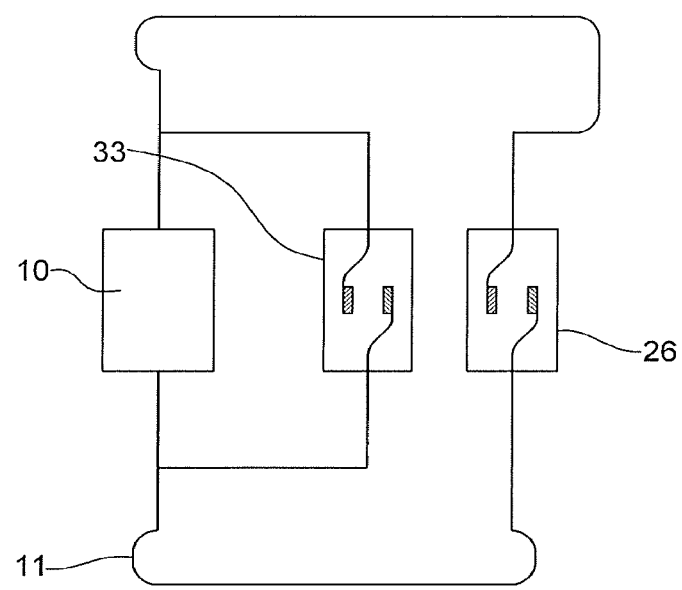

FIGS. 9 and 10 present other configurations which make it possible to secure completely a near-field communication device using Reed switches. In order to guard against the risk of fraudulent connection by means of a reader and a magnet, the portable object comprises an additional security switch 33 which is likewise a Reed switch. In contrast to the main Reed switch 26, the security switch 33 is not connected to a permanent magnet because it is not intended to change state during normal functioning but solely in the case of attack.

In a first configuration represented in FIG. 9, the security switch 33 is mounted in series with the Reed switch 26. The security switch 33, in this case, is a switch of the NC type, normally closed, this means that it is closed in the absence of a magnetic field and that it switches into the open position under the effect of a magnetic field. The Reed switch 26 is of the NO type, normally open, and operates inversely to the former. In the case of attack using a magnet, the security switch 33 and the Reed switch 26 switch simultaneously under the effect of the external magnetic field so that the communication device remains inactive, the security switch being open. Preferably the Reed switch 26 and the security switch 33 are disposed as near as possible whilst ensuring that displacement of the permanent magnet 27, controlling the switch 26, has no effect on the security switch 33.

In a second embodiment represented in FIG. 10, the security switch 33 is mounted in parallel with the Reed switch 26. In this configuration, the two switches are of the same type. In the example represented in FIG. 10, they are of the NO type, the security switch being mounted on a bypass branch. In the case of attack by an external magnetic field, the security switch closes simultaneously with the Reed switch so that the antenna 11 is short-circuited and the device remains inactive. Likewise, two switches of the NC type could be used, by inverting their position, the controlled Reed switch 26 being, on this occasion, on the bypass branch.

Figure 11:
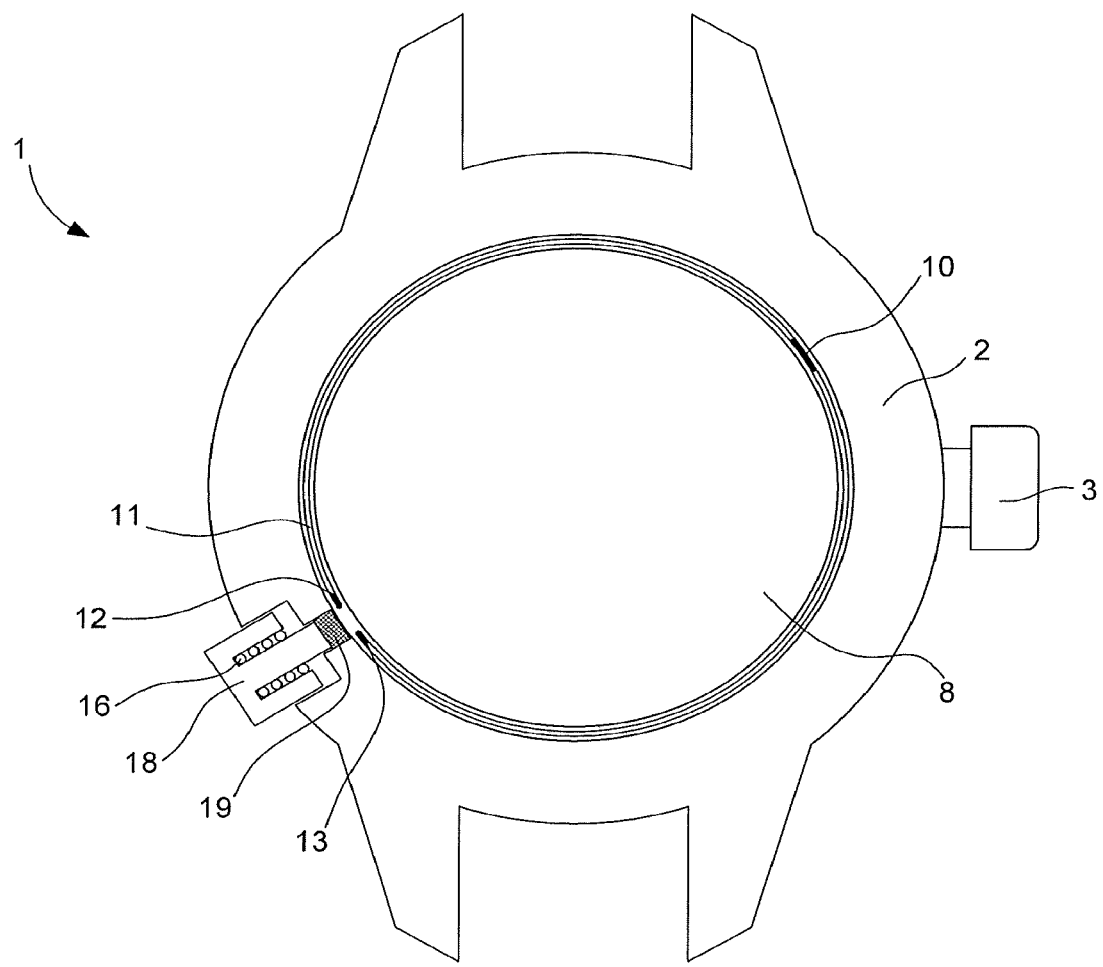
FIG. 11 represents the view of a watch according to a second embodiment of the invention.

FIG. 11 represents a second embodiment of a watch 1 according to the invention comprising a middle 2 in which a movement 8 is housed. A near-field communication device is mounted on the periphery of the movement 8 and comprises an electronic chip 10 and an antenna 11. The antenna 11 forms an open loop provided with two end portions 12, 13, situated opposite a push button 18. The end 19 of the push button 18 is produced in a conductive material and is provided in order to come to abut jointly against the two end portions 12, 13. In order to do this, at least one of the end portions can be mounted on an elastic support or even the end 19 can be mounted slightly pivotably relative to the push button 18.

The push button 18 comprises, furthermore, a restoring spring 16 which retains the push button in a passive position in which there is no contact between the end 19 and the end portions 12, 13. In this passive position, the electrical circuit formed by the antenna 11 and the chip 10 is open, which renders the communication device inactive. When the push button 18 is pressed, its end 19 is displaced and comes to abut against the two end portions 12, 13, which has the effect of closing the electrical circuit formed by the chip 10 and the antenna 11 and of rendering the near-field communication device active. As soon as pressure on the push button 18 is released, the latter returns automatically into its passive position and the communication device is deactivated. Of course, it is possible to produce the two previously explained variants via the control crown whether by rotation or by pressure. As previously, the galvanic switch can be replaced by a magnetic switch. In this case, a permanent magnet can be connected kinematically to the push button or to the control crown in order to control a Reed switch replacing the end portions. As previously, it is possible to configure the push button so that it is in parallel to the electrical circuit and so that, at the moment when the user presses it, it opens the contact and renders the system active.

Figure 12:
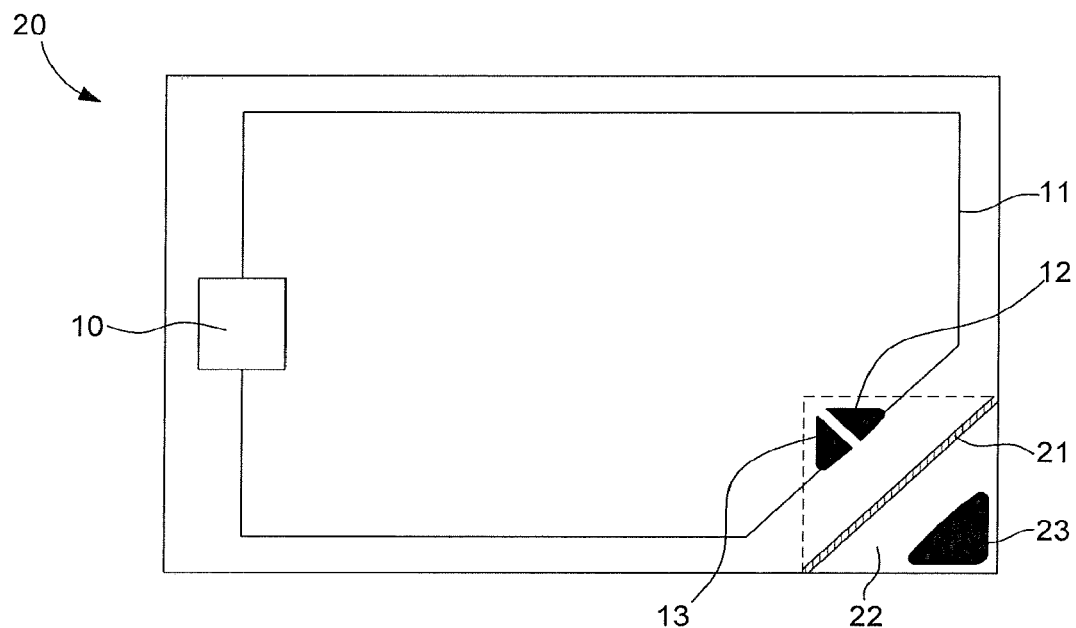
FIGS. 12 and 13 represent a first variant of a chip card according to the invention, respectively in the passive and active positions if the switch is in series with the electrical circuit.
Figure 13:
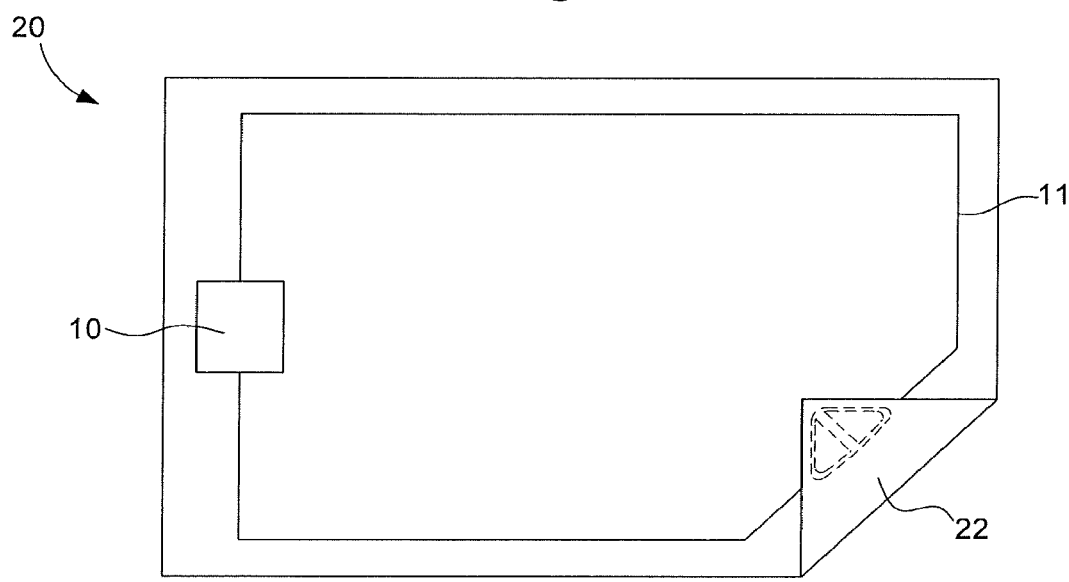

FIGS. 12 and 13 represent another type of portable object according to the invention, i.e. a chip card 20. The latter comprises a near-field communication device which is embedded in the material and formed by an antenna 11 connected to an electronic chip 10. The antenna 10 forms an open loop ending with two portions 12, 13 which open on the surface of the card 20. These portions are conductive and insensitive to the environment, in the manner of the electrical contacts of a bank card. A flexible segment 21 produced for example in an elastomeric material delimits a part 22 and forms a hinge which makes it possible for the part 22 to be folded. The part 22 constitutes a control element which is able to be displaced about the hinge formed by the flexible segment 21. In the absence of any pressure, the part 22 is situated in the plane of the chip card 20, i.e. in the passive position represented in FIG. 5. The part 22 comprises a conductive plate 23, which protrudes slightly and is provided in order to come to abut against the end portions 12, 13 when the part 22 is folded into the active position represented in FIG. 13 in order to close the electrical circuit formed by the antenna 11 and the chip 10 and to activate the near-field communication device. The elasticity of the material forming the flexible segment 21 allows automatic elastic restoration of the part 22 into the passive position. Alternatively, the part 22 could comprise a permanent magnet 27 and control a Reed switch 26 mounted in series on the loop of the antenna 11.

Figure 14:
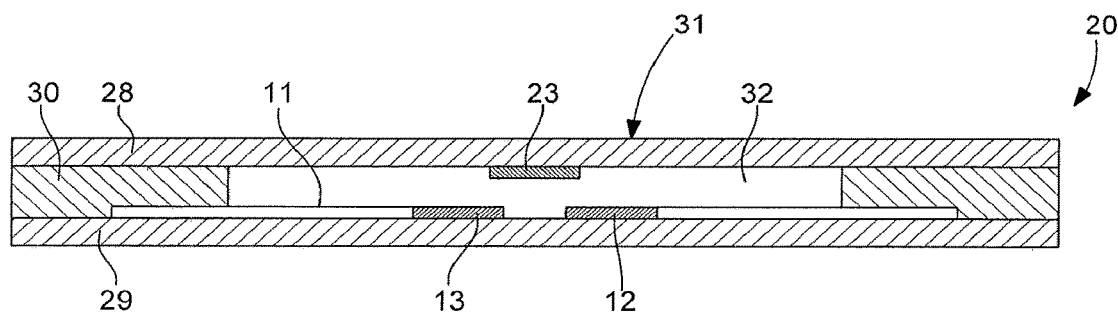
FIGS. 14 and 15 represent a sectional view of a second variant of a chip card according to the invention.
Figure 15:
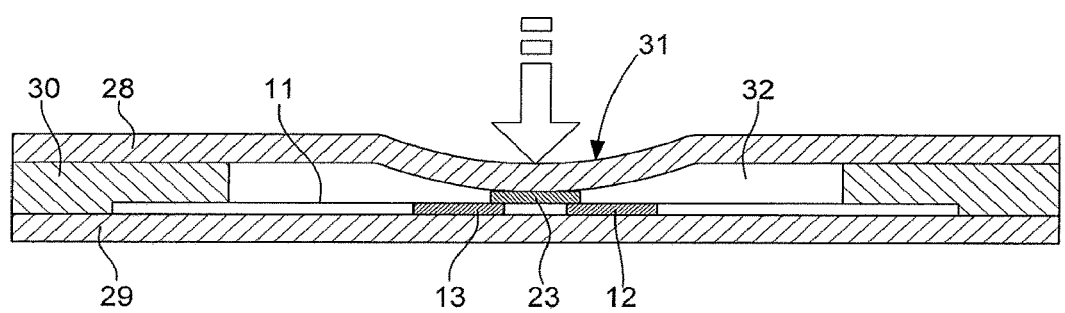

FIGS. 14 and 15 represent an embodiment variant of a chip card according to the invention. The chip card 20 here is viewed in section, the communication device is in the passive state in FIG. 14 and the active state in FIG. 15. The chip card 20 has a multilayer structure. It is composed of a lower layer 29 intended to come to abut against a reader, an upper layer 28 and between the two, a spacer 30. The spacer 30 and the lower 29 and upper 31 layers delimit a recess 32 inside the chip card 20. The end portions 12, 13 and the conductive plate 23, described in the preceding embodiment, are found once again. These elements are placed in the cavity 32 one opposite the other, on the internal faces of the lower and upper layers. The upper layer 28 comprises a deformable wall 31, delimiting the recess 32 at least partially. By exerting pressure on the deformable wall 31, the latter is displaced from a passive position into an active position in which the electrical contact is established between the end portions 12, 13 and the conductive plate 23. The deformable wall 31 thus constitutes the control element. The elasticity of the wall makes it possible for it to recover its original passive position as soon as the pressure is released.

The portable objects according to the invention offer great ease of use and better security than those provided with electronic switches of the prior art, the change of state of which must be controlled in advance from an external electronic device, for example from a smartphone.

Advantageously, the security device proposed by the invention makes it possible to eliminate any risk of fraudulent communication because the device can be activated when the portable object is already situated near and under the magnetic influence of the reader with which it is intended to communicate so that communication is established instantaneously with the target reader as soon as the control element is displaced into the active position. Furthermore, automatic return of the control element into its passive position immediately secures the device as soon as the desired operation has been effected and even if the portable object is again found within range of the magnetic field of the target reader. Furthermore, the mechanical locking means proposed by the invention gives the user control of the security of the near-field communication device and gives him confidence in the use of this technology which he has lacked until now.

Use of the Ceragold™ process for producing an antenna offers several advantages. It makes it possible to integrate the antenna easily in a watch part, such as for example the bezel or even the dial or the case. This integration can be effected in a visible and aesthetic manner on an external face or, on the contrary, discreetly on an internal face. This manufacturing method makes it possible likewise to produce an extremely durable and solid antenna which is able to resist ageing in the most severe conditions of use and the most hostile of environments. Production of the antenna can in addition be combined easily with that of markings intended to facilitate reading of time information. Similarly, the use of amorphous metal as conductive element is also conceivable.

The person skilled in the art will be able to produce multiple variants from the presented embodiments without departing from the scope of the claims.

What is claimed is:

1. A portable object comprising a near-field communication device, the communication device comprising:
   an electronic chip;
   an antenna including ends configured to connect electrically to the electronic chip to form an electrical circuit;
   a mechanical control element configured to be displaced between two predefined positions including an active position wherein the communication device is activated and a passive position wherein the communication device is deactivated;
   a mechanical switch configured to switch between an open state and a closed state in response to a displacement of the mechanical control element between the two predefined positions, wherein the mechanical switch is a Reed switch;
   a permanent magnet configured to move relative to the Reed switch and configured to modify a state of the Reed switch in response to a displacement of the mechanical control element; and
   an elastic restoring element configured to return the mechanical control element automatically from the active position to the passive position.

2. The portable object according to claim 1, wherein the mechanical switch is mounted in series on the electrical circuit and wherein the mechanical switch is situated in the open state when the mechanical control element is in passive position.

3. The portable object according to claim 1, wherein the mechanical switch is mounted in parallel with the antenna and wherein the mechanical switch is situated in the closed state when the mechanical control element is in passive position.

4. The portable object according to claim 1, wherein the permanent magnet is connected kinematically to the mechanical control element.

5. The portable object according to claim 1, wherein the Reed switch is connected kinematically to the mechanical control element.

6. The portable object according to claim 1, further comprising at least two Reed switches disposed in a perpendicular manner.

7. The portable object according to claim 1, further comprising a security switch configured to change state simultaneously with the Reed switch in a presence of an external magnetic field.

8. The portable object according to claim 1, further comprising a time delay element configured to delay return of the mechanical control element from the active position to the passive position.

9. The portable object according to claim 1, wherein the portable object is a watch.

10. The portable object according to claim 9, further comprising a pivoting bezel, and wherein the mechanical control element is the pivoting bezel.

11. The portable object according to claim 10, wherein the antenna is formed by a "Ceragold™" process.

12. The portable object according to claim 10, wherein the antenna is formed by an "Amorphous Metal" process.

13. The portable object according to claim 9, further comprising a push button, and wherein the mechanical control element is the push button.

14. The portable object according to claim 9, further comprising a control crown, and wherein the mechanical control element is the control crown.

15. The portable object according to claim 1, wherein the portable object is a chip card.

16. The portable object according to claim 15, wherein the chip card comprises a flexible segment delimiting a part, and wherein the flexible segment delimiting part is the mechanical control element.

17. The portable object according to claim 15, wherein the chip card comprises a deformable wall delimiting at least partially a recess, and wherein the deformable wall is the mechanical control element.

* * * * *